No. 861,688. PATENTED JULY 30, 1907.
K. WESSEL.
MACHINE FOR TREATING FLAX.
APPLICATION FILED AUG. 9, 1906.

4 SHEETS—SHEET 1.

Witnesses.
A. H. Opsahl.
H. S. Kilgore

Inventor.
Karl Wessel
By his Attorneys
Williamson & Merchant

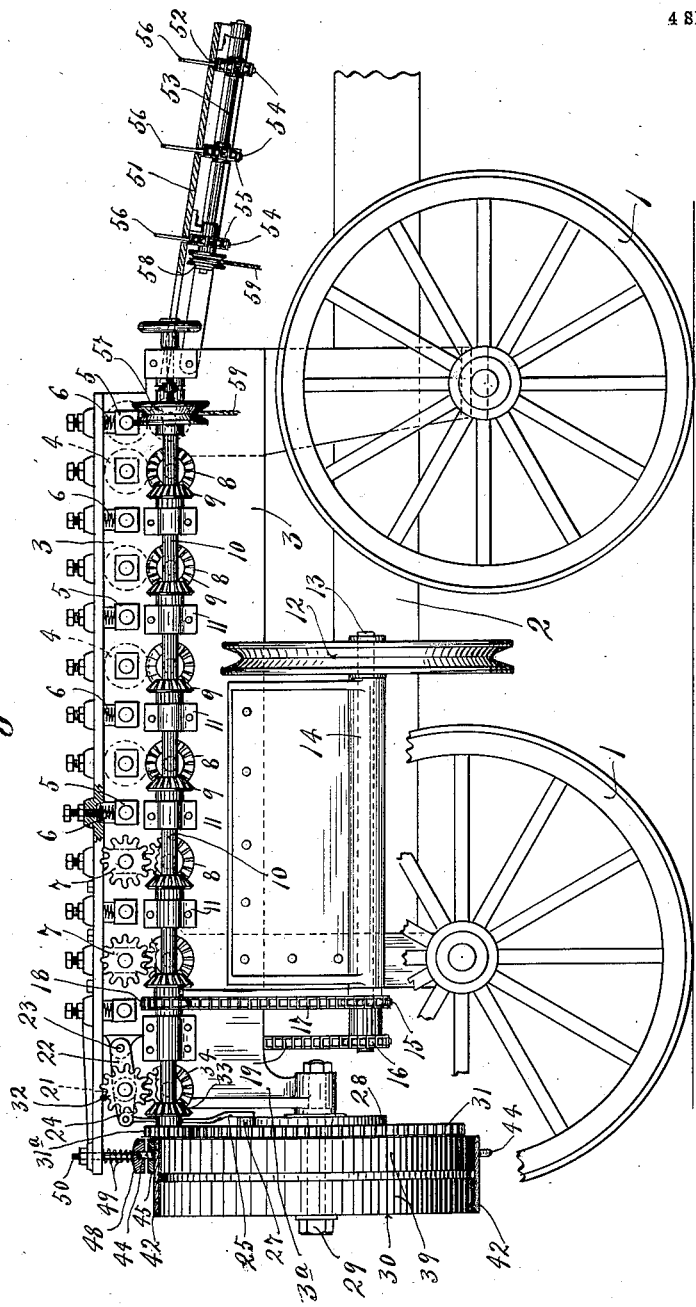

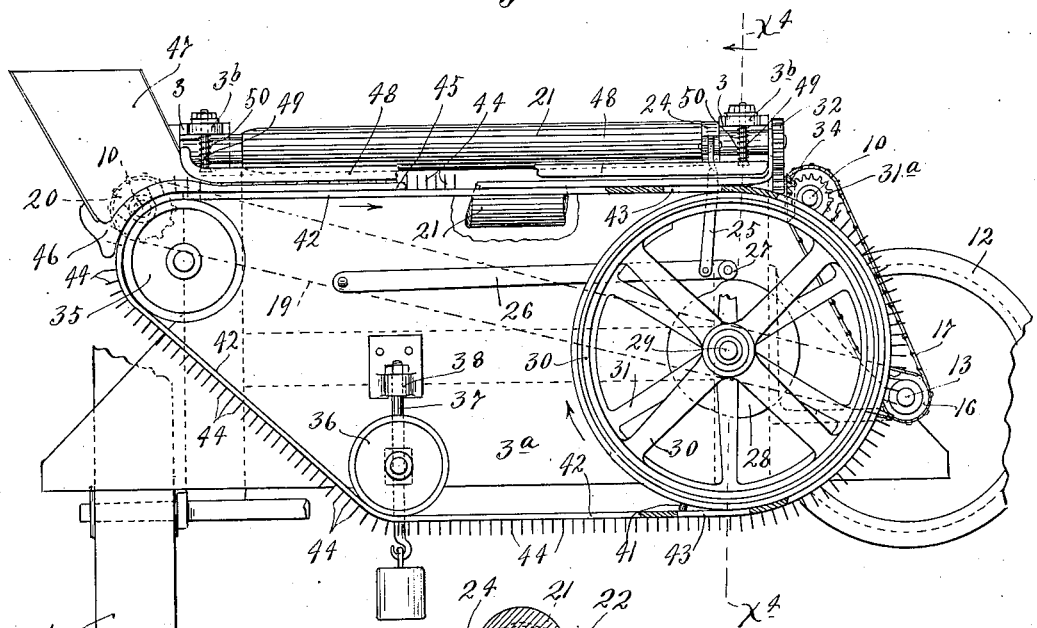
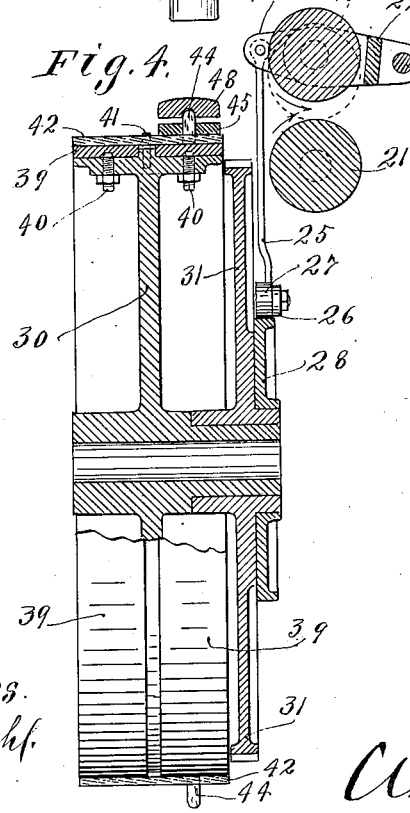
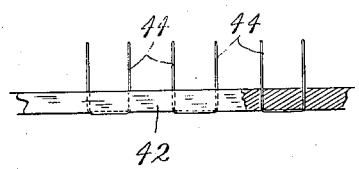

No. 861,688.

PATENTED JULY 30, 1907.

K. WESSEL.
MACHINE FOR TREATING FLAX.
APPLICATION FILED AUG. 9, 1906.

4 SHEETS—SHEET 4.

Witnesses.
A. H. Opsahl.
H. S. Kilgore.

Inventor.
Karl Wessel.
By his Attorneys.
Williamson Merchant

UNITED STATES PATENT OFFICE.

KARL WESSEL, OF ST. PAUL, MINNESOTA.

MACHINE FOR TREATING FLAX.

No. 861,688.　　　　　Specification of Letters Patent.　　　Patented July 30, 1907.

Application filed August 9, 1906. Serial No. 329,831.

*To all whom it may concern:*

Be it known that I, KARL WESSEL, a citizen of the United States, residing at St. Paul, in the county of Ramsey and State of Minnesota, have invented certain new and useful Improvements in Machines for Heating Flax; and I do hereby declare the following to be a full, clear, and exact description of the invention, such as will enable others skilled in the art to which it appertains to make and use the same.

My invention has for its object to provide an improved machine for treating flax straws and for removing the seeds therefrom, and to the above ends the invention consists of the novel devices and combinations of devices hereinafter described and defined in the claims.

In this improved machine, the flax straw is placed within a suitable hopper, and by a traveling spreader, which is in the nature of an endless power driven toothed belt, the flax is taken from the bottom of the hopper or holder and is spread out in a thin sheet, and is delivered in front of a plurality of pairs of rollers. These rollers extend parallel to the plane of movement of the traveling spreader, and the most forward pair of said rollers are arranged to act as initial feed rollers, and means is provided for spreading the same so that the flax straw may be carried laterally between the same, while it is being spread out in a sheet, by the toothed spreader belt. The spreader belt is moved intermittently; it is given its straw spreading movement while the initial feed rollers are separated from each other; and it is arranged to stand still while the initial feed rollers are pressed together and are driven so as to cause the sheet of flax straw, interposed between the same, to be fed forward to and between the successive pairs of mangle rollers.

The improved machine is illustrated in the accompanying drawings, wherein like characters indicate like parts throughout the several views.

Figure 1:
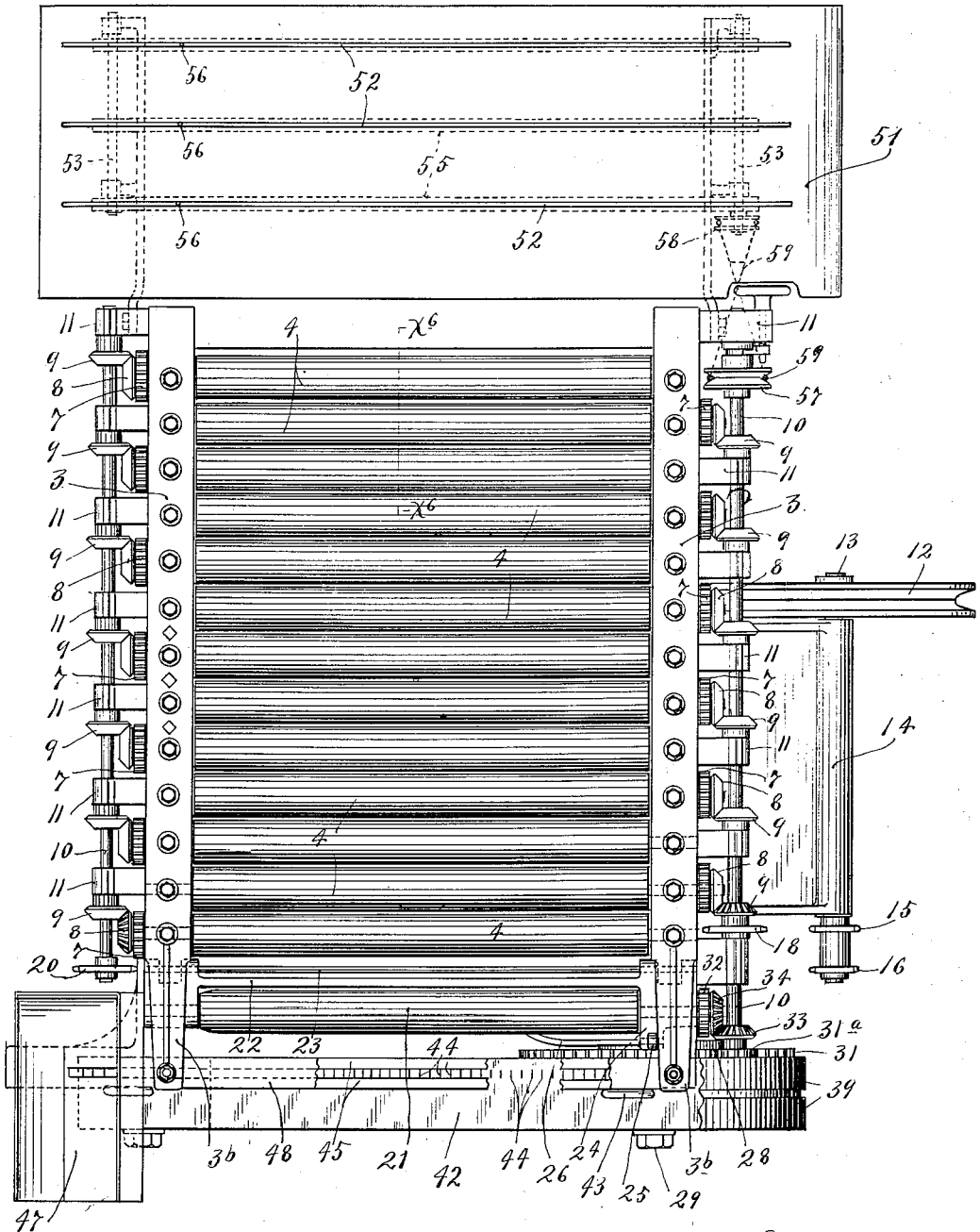
Figure 6:
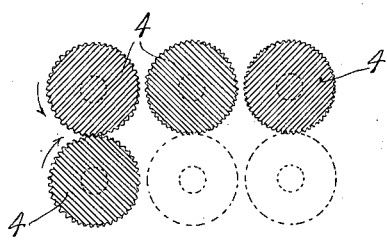
Figure 7:
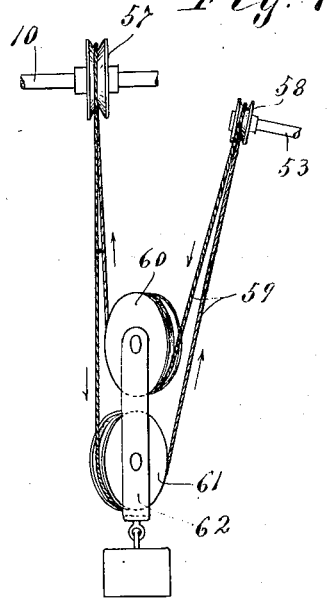

Referring to the drawings: Figure 1 is a plan view of the improved machine, some parts being broken away. Fig. 2 is a side elevation of the machine, some parts being sectioned. Fig. 3 is a rear elevation of the improved machine, some parts being broken away. Fig. 4 is a vertical section taken approximately on the line $x^4$ $x^4$ of Fig. 3. Fig. 5 is a detail partly in elevation and partly in section, showing a portion of the toothed spreader belt. Fig. 6 is a detail in vertical section taken through several of the mangle rollers on the line $x^6$ $x^6$ of Fig. 1; and Fig. 7 is a diagrammatic view showing one of the intermediate belt and pulley drives of the machine.

The improved machine hereinafter described, is designed as a portable machine which may be readily transported from place to place, and hence the same is mounted on a heavy wagon truck indicated in diagram in the drawings, the wheels and frame thereof being indicated, respectively, by the numerals 1 and 2. Rigidly secured on the truck frame 2 is a heavy bed frame 3 preferably in the form of a casting that is rectangular in plan view. The mangle rollers 4 are arranged in horizontally disposed pairs. The lower mangle rollers are directly journaled in the side flanges of the bed plate 3, while the upper rollers are journaled in bearing blocks 5 that are slidably mounted in vertical seats, formed in the side flanges of said bed plate 3, and are subject to adjustable spring tension devices 6. The upper and lower members of the pairs of rollers 4 are geared to run together, in reverse directions, by intermeshing spur gears 7 applied to the shafts thereof. The shafts of adjacent lower rollers 4 project alternately from opposite sides of the bed plate 3 and their projecting ends are provided with miter gears 8. The miter gears 8 that are located on one side of the bed plate 3 mesh with miter gears 9 carried by a long counter-shaft 10 journaled in suitable bearings 11 on said bed plate. It will thus be seen that there is one shaft 10 located at each side of the machine, and that each of these shafts, through the gears 9 carried thereby, transmits rotary motion to the alternate coöperating mangle rollers 4. Motion is imparted to the two shafts 10 from a power driven pulley 12, shown as secured to a counter-shaft 13 journaled in a heavy bearing bracket 14 which, as shown, is rigidly secured to one side of the bed plate 3 and depends therefrom. At its rear end, the shaft 13 carries a pair of sprockets 15 and 16. A sprocket chain 17 runs over the sprocket 15 and a sprocket 18 on one of the shafts 10, and a sprocket chain 19 runs over the sprocket 16 and over a sprocket 20 on the other of said shafts 10. In this way, the two shafts 10 are simultaneously driven from the shaft 13, which shaft 13 may be driven by a belt (not shown), but which will run over the pulley 12 and will itself be driven from any suitable source of power. By this means, the several pairs of mangle rollers 4 are driven in the direction of the arrows marked thereon in Fig. 6.

Mounted parallel with and located just at the rear of the series of pairs of mangle rollers 4, is a pair of so-called "initial" feed rollers 21, the lower of which rollers is journaled in a rearwardly and transversely extended bearing bracket 3ª of the bed plate 3. The upper feed roller 21 is journaled in the end portions of a long lever acting frame 22 that is hinged at 23 to the side flanges of the bed plate 3 and is provided at one end with a projecting arm 24 to which a depending link 25 is pivotally attached. The link 25 is pivotally attached at its lower end to a long lever 26 which, at one end, is pivoted to the bracket 3ª (see Fig. 3) and at its free end is provided with a roll 27 that works on a cam 28 mounted on a stud or spindle 29 rigidly secured to the bracket 3ª.

Loosely journaled on the spindle 29 is a large wheel or pulley 30 to the hub of which is secured a spur gear 31. The cam 28, as well as the gear 31, are carried by the wheel 30 and, as shown, said cam is directly secured to the hub of said gear (see particularly Fig. 4).

The shafts of the two primary feed rollers 21, at one end, are connected by spur gears 32 (see Fig. 2), the teeth of which gears are not long enough to maintain engagement when the upper roller 21 is raised by the cam 28, approximately as shown in Fig. 4. The right hand shaft 10, as viewed in Figs. 1 and 3, is provided with a miter gear 33 that meshes with a miter gear 34 carried by the adjacent end of the shaft of the lower roller 21, so that the said two initial feed rollers 21 will be positively rotated in the direction of the arrows marked thereon in Fig. 4. The left hand ends of the initial feed rollers 21 are preferably tapered or pointed slightly, as shown in Fig. 1, so as to assist in directing the stems of the flax straw laterally between said rollers, as will presently more fully appear.

Loosely journaled on the upper left hand portion of the bracket 3ᵃ is a belt guiding pulley 35. At the lower intermediate portion of the bracket 3ᵃ is a belt tightening pulley 36 which, as shown, is journaled on a weighted plunger 37 which, in turn, is mounted to move vertically through a lug 38 on said bracket 3ᵃ.

The large wheel or pulley 30 is provided with a loose or supplemental rim portion which, as shown, is made up of two rings 39 that are mounted to freely rotate upon the rim proper of said wheel, but are held against lateral displacement by set screws 40, shown as screwed through the rim of said wheel and engaging with annular internal grooves of said rings 39. The two rings 39 are spaced apart so that an intervening portion of the wheel rim proper is provided with a radial driving pin 41 that projects outward beyond the peripheries of said rings.

A heavy wide faced belt 42 runs over the driving wheel 30, the guide wheel or pulley 35, and under the belt tightening pulley 36. The said belt 42 runs directly upon the loose rings 39 or supplemental rim of the large driving wheel 30. The driving pin 41 of the wheel 30 is arranged to engage intermittently with longitudinal slots 43 formed in the belt 42. The belt 42 is provided with a plurality of outwardly projecting longitudinally spaced teeth 44 that are preferably in the form of thin blades set edgewise in a direction transversely of the said belt. These teeth 44 extend only a very small part of the way across the wide faced belt 42, and in moving from the guide pulley 35 to the driving pulley 30 they are arranged to travel between a pair of horizontally extended laterally spaced guide bars 45, above which the said teeth project, as clearly shown in Figs. 3 and 4. The longitudinally extended side portions of the bed plate 3, at their rear ends, are shown as provided with projecting arms 3ᵇ that overlie the guide bars 45; and the said guide bars, at their right hand ends, are shown as turned upward and rigidly secured to the right hand member of these arms 3ᵇ. At their left hand ends, the guide bars 45 are formed with segmental portions 46, the inner surfaces of which closely follow the belt in its movement over the guide pulley 35. These segmental bar sections 46 are, as shown, rigidly secured to the bottom of a hopper 47, which hopper, in turn, is rigidly secured to the bearing bracket 3ᵃ. The said segmental portions 46, in fact, constitute part of the bottom of the said hopper 47. The upper surfaces of the said segmental portions 46 extend eccentric to the axis of the guide pulley 35, and gradually more closely approach said axis in a direction upwardly and toward the right. Otherwise stated, the upper surfaces of the segmental portions 46 are so extended that the belt teeth 44 at the extreme bottom of the hopper, will not project above the same, but as the said teeth move toward the right with respect to Fig. 3, they will gradually project and acquire an increasing hold upon the flax straws that are at the bottom of the hopper. In this way, each tooth will take hold of several straws and will carry the same from the bottom of the hopper without causing the straws to be tangled and, furthermore, an even selection and feed of the straw is in this way insured.

The straws carried from the hopper by the teeth 44 are carried under a yielding presser bar 48 that overlies the guide bars 45 and, as shown, is supported from the overlying arms 3ᵇ by short bolts 49, light coiled springs 50, as shown, being placed on the said bolts between said bar 48 and arms 3ᵇ. As preferred and as shown, in Fig. 4, the presser bar 48 is provided in its under surface with a longitudinally extended groove through which the upper ends of the belt teeth 44 are arranged to pass in their straw carrying movement from the hopper to the right hand end of the said presser bar.

Directing attention now particularly to Fig. 3, it will be seen that one of the slots 43 of the belt 42 stands at the bottom of the driving wheel 30 and in such position that the driving pin 41 of said wheel is just leaving or passing out of the same; and it will also be noted that another of the said slots 43 is at the top of the said driving wheel in such position that the driving pin 41 may freely enter the same. It will now be understood that while the driving pin 41 is passing upward from the lower slot noted to the upper slot noted, the driving belt 42 will stand still and the driving wheel 30 will rotate freely within the loose rings 39, the said rings being then held against rotation by their frictional engagement with the belt 42. It will also be understood that when the driving pin 41 engages with the upper slot of the belt 42, the said belt will be caused to travel until that particular slot thereof is moved to the position indicated by said lower slot. Briefly stated, the spreader belt 42 will be moved intermittently throughout approximately one half of each rotation of the driving wheel 30, and will be left standing stationary throughout approximately the other half of each rotation of said wheel; and each such movement will so move the said toothed spreader belt 42 that a thin sheet or layer of flax straw will be spread out between the initial feed rollers 21.

The cam 28 is so timed for action on the roll 27 of the lever 26 that the upper feed roller 21 will be raised just before the spreader belt 42 is given its movement, and it will be again lowered approximately at the completion of the said belt's movement.

The lower roller 21 and all of the rollers 4 are constantly driven, but the initial feed rollers 21 which deliver to the mangle rollers 4 will not act upon the straws delivered between the same, while the upper roller 21 is raised, or, at any rate, any slight tendency which the driven roller 21 may have to feed the flax straws endwise toward the rollers 4 will be resisted by the frictional tension exerted thereon, by the presser bar 48, so that the endwise feed movement of the flax straw will take place only when the upper feed roller 21 is pressed downward and the spreader belt 42 is stationary. The flax straws should, of course, be placed within the hopper 47 with their butt ends projecting toward the mangle rollers 4.

The initial feed rollers 21 may be either smooth or slightly corrugated. The socalled "mangle" rollers 4 should be corrugated and their corrugations in cross section should be rounded substantially as shown in Fig. 6. Furthermore, the corrugations of the said mangle rollers should be of greater pitch and deeper on those that are nearest the feed rollers 21, and should be of less pitch and shallower on those that are nearest to the delivery end of the machine. By such arrangement, the brittle particles of the flax straw will be first broken into comparatively long lengths, and will subsequently be broken into shorter and shorter lengths as it is fed through the several series of coöperating mangle rollers.

As the flax straws are fed endwise between the initial feed rollers 21 and are drawn endwise between the coöperating bars 45 and 48, a great many of the seed-containing pods will be stripped off, but some of the said pods will pass between the said bars and will come into contact with the said rollers 21, and by said rollers, the pods will be broken open and the flax seeds will be pressed out of the same. The tension or downward pressure on the upper feed roller 21 should not be great enough to crush any flax seeds which may be carried with the straw between the said two rollers 21. The tension on the several pairs of coöperating mangle rollers should be increased in a direction forward or away from said feed rollers 21, so that the crushing of the fiber of the flax straw will be accomplished progressively.

The mangled flax straw is delivered from the mangle rollers onto a deck or table 51 which, as shown, is pivotally supported from the forward end of the bed plate 3. This deck 51 is, as shown, provided with parallel slots 52 that extend transversely of the machine, or parallel to the axis of the rollers 4. Mounted in suitable bearings on the under side of this deck 51 near the ends thereof, is a pair of parallel shafts 53 that extend longitudinally of the machine and are provided each with a plurality of sprockets 54. Sprocket chains 55 run over the alined sprockets 54 of the two shafts 53, and each chain 55 is provided with a rake tooth 56. The rake teeth 56 of the several chains are alined with each other longitudinally of the machine, and they are arranged to travel in and project upward through the slots 52 of the deck, and thus intermittently engage and scrape from the deck 51 all mangled flax delivered onto the said table from the mangle rollers.

The endless traveling rake made up of the toothed chains 55—56 may be conveniently driven from one or the other of the shafts 10, and to this end the right hand shaft 10 is shown as provided with a driving sheave 57, and the rear end of the right hand shaft 53 is shown as provided with a sheave 58. Fig. 7 illustrates, diagrammatically, the manner in which motion may be transmitted from the sheave 57 to the sheave 58, by means of a crossed belt 59 which runs over the said two sheaves and over tightening sheaves 60 and 61. The belt tightening sheaves 60—61 may be mounted in any suitable way, but preferably they will be mounted on a floating weighted frame 62. With the belt connections shown, the traveling rake 55—56 is arranged to deliver the mangled flax off from the right hand end of the deck 51, directions being taken with respect to Fig. 1.

As already stated, all of the parts of the machine are preferably mounted on a truck, so that the machine may be easily moved from place to place, either in the field or elsewhere. As a motive power for running the machine, an engine, such as an explosive engine, may be mounted on the truck and arranged to impart motion to the driving pulley 12.

What I claim is:

1. In a machine of the kind described, the combination with feed rollers and means for intermittently separating the same, of means for spreading the straws or stems laterally in the form of a sheet and for interposing the same between said rollers while the latter are separated, substantially as described.

2. In a machine of the kind described, the combination with feed rollers and means for driving and for intermittently separating the same, of an endless feed device arranged to feed the straws or stems laterally between said rollers while the latter are separated, substantially as described.

3. In a machine of the kind described, the combination with mechanism for treating the straws, of feed mechanism therefor comprising a pair of rollers and means for intermittently separating the same, of means for feeding the straws laterally between said feed rollers while the same are separated, substantially as described.

4. In a machine of the kind described, the combination with a pair of feed rollers and means for driving and for intermittently separating the same, of a hopper or holder for the straws or stems, and an endless toothed feed belt arranged to carry the straws or stems laterally from said hopper or holder and to spread out the same between said rollers, while the latter are separated, substantially as described.

5. In a machine of the kind described, the combination with a pair of feed rollers and means for driving and for intermittently separating the same, of mangle rollers receiving straws or stems from said feed rollers, a hopper arranged to hold the straws or stems in the vicinity of one end of said feed rollers, an endless toothed feed belt arranged to carry the straws or stems laterally from said hopper and to spread the same out in a sheet between said feed rollers, while the latter are separated, substantially as described.

6. In a machine of the kind described, the combination with feed rollers and means for driving and for intermittently separating the same, upper and lower guide rails extending parallel to said feed rollers and in the vicinity thereof, and an endless toothed feed belt arranged to take up and spread out straws or stems and to carry the same between said guide rails and between said feed rollers, while the latter are separated, substantially as described.

7. In a machine of the kind described, the combination with feed rollers and means for driving and intermittently separating the same, of a hopper near one end of said rollers, a guide wheel below said hopper, a driving wheel near the other end of said rollers, a toothed feed belt running over said guide wheel and over said driving wheel, and a guide rail extending parallel to said feed rollers throughout its main length, and having at one end a segmental portion that constitutes a bottom to said hopper and extends eccentric to the axis of the underlying guide wheel, substantially as described.

8. In a machine of the kind described, the combination with feed rollers and means for driving and for intermittently separating the same, of a hopper near one end of said rollers, an underlying guide wheel, an intermittently acting drive wheel near the other end of said rollers, a guide rail extending parallel to said feed rollers throughout its main length and terminating at one end in a segmental section that extends eccentric to the axis of the underlying guide wheel, a yielding presser bar overlying said guide wheel, and a toothed feed belt running over said driving wheel and over said guide wheel, and under the segmental end portion of said guide rail, said presser bar being grooved to receive the ends of the teeth of said feed belt, susbtantially as described.

9. In a feed device of the kind described, the combination with a drive wheel having a loose rim portion, and a driving projection, of a coöperating guide wheel, and a feed belt arranged to run over the loose rim portion of said driving wheel and over said guide wheel, and which belt is intermittently subject to the driving projection of said driving wheel, substantially as described.

10. In a feed device of the kind described, the combination with a driving wheel having a loose rim portion and a driving projection, of a coöperating guide wheel, a hopper in the vicinity of said guide wheel, a pair of feed rollers extended parallel to the plane of said driving wheel and guiding wheel, means for driving and for intermittently separating said feed rollers, and a toothed feed belt arranged to run over the loose rim portion of said driving wheel, over said guide wheel and under said hopper, and which feed belt is intermittently subject to the driving projection of said driving wheel, and is arranged to carry straws or stems from said hopper, and to spread the same out in a sheet between said feed rollers, while the latter are separated, substantially as described.

11. The combination with a pair of feed rollers and means for driving and for intermittently separating the same, of a pair of laterally spaced guide rails extending throughout their main length parallel to said feed rollers and terminating at one end in segmental sections, a hopper open at its bottom to the segmental end of said guide rails, a yielding presser bar overlying said guide rails, a guide wheel underlying and located eccentric to the segmental ends of said guide rails, a driving wheel located near the other ends of said guide rails, said driving wheel having loose rim portions, and a projecting driving lug, and a toothed guide belt running over the loose rim portions of said driving wheel, over said guide wheel and under said guide rails, with its teeth arranged to work between said guide rails, and which belt is intermittently subject to the driving lug of said driving wheel, substantially as described.

In testimony whereof I affix my signature in presence of two witnesses.

KARL WESSEL.

Witnesses:
MALIE HOEL,
F. D. MERCHANT.